(12) United States Patent
Martinez (10) Patent No.: US 11,662,426 B2
(45) Date of Patent: May 30, 2023

(54) MARITIME SURVEILLANCE RADAR (71) Applicant: Airbus Defence and Space Limited, Stevenage (GB)

(72) Inventor: Jose Marquez Martinez, Portsmouth (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 17/776,240

(22) PCT Filed: Nov. 11, 2020

(86) PCT No.: PCT/GB2020/052860
§ 371 (c)(1),
(2) Date: May 12, 2022

(87) PCT Pub. No.: WO2021/094740
PCT Pub. Date: May 20, 2021

(65) Prior Publication Data
US 2022/0365171 A1 Nov. 17, 2022

(30) Foreign Application Priority Data
Nov. 13, 2019 (EP) .................................... 19275122

(51) Int. Cl.
*G01S 7/292* (2006.01)
*G01S 13/91* (2006.01)
(Continued)

(52) U.S. Cl.
CPC .......... *G01S 7/2921* (2013.01); *G01S 13/582* (2013.01); *G01S 13/86* (2013.01); *G01S 13/917* (2019.05)

(58) Field of Classification Search
CPC .... G01S 7/2921; G01S 13/917; G01S 13/582; G01S 13/86; G01S 13/89
See application file for complete search history.

(56) References Cited

U.S. PATENT DOCUMENTS 4,042,925 A * 8/1977 Albanese .............. G01S 13/325
342/194
4,839,656 A * 6/1989 O'Neill ................... G01S 13/78
342/33
(Continued)

FOREIGN PATENT DOCUMENTS

| EP | 0 795 762 A2 | 9/1997 |
| WO | WO 2017/048339 A1 | 3/2017 |
| WO | WO 2018/162756 A1 | 9/2018 |

OTHER PUBLICATIONS

Buford, Jean et al., "A Muliple Beam Synthetic Aperture Radar Design Concept for Geoscience Applications", IEEE Transactions Geoscience and Remote Sensing, vol. GE-21, No. 2, Apr. 1983, pp. 201-207 (Year: 1983).*

(Continued)

*Primary Examiner* — Peter M Bythrow
(74) *Attorney, Agent, or Firm* — Nelson Mullins Riley & Scarborough LLP (57) ABSTRACT

A maritime radar system is provided, comprising a transmitter, a receiver, and one or more processors arranged to provide range and azimuth discrimination of a detection area by performing a delay/Doppler analysis of the echo of a single beam transmitted by the transmitter and received by the receiver.

8 Claims, 6 Drawing Sheets

(51) Int. Cl.
*G01S 13/58* (2006.01)
*G01S 13/86* (2006.01)

(56) References Cited

U.S. PATENT DOCUMENTS

| | | | | | |
|---|---|---|---|---|---|
| 4,965,586 | A * | 10/1990 | O'Neill | | G01S 13/89 |
| | | | | | 342/453 |
| 5,296,711 | A * | 3/1994 | Leonard | | G01V 8/02 |
| | | | | | 250/301 |
| 5,440,311 | A * | 8/1995 | Gallagher | | G01S 13/522 |
| | | | | | 342/162 |
| 5,546,087 | A * | 8/1996 | Martin Neira | | G01S 13/003 |
| | | | | | 342/120 |
| 5,703,647 | A * | 12/1997 | Kim | | H04N 19/44 |
| | | | | | 375/E7.181 |
| 5,812,082 | A * | 9/1998 | Moreira | | G01S 13/9056 |
| | | | | | 342/191 |
| 7,672,801 | B1 * | 3/2010 | Sczaniecki | | G01S 5/0289 |
| | | | | | 702/95 |
| 7,768,443 | B2 * | 8/2010 | Imazu | | B63B 49/00 |
| | | | | | 340/984 |
| 7,830,275 | B2 * | 11/2010 | Hiraoka | | G01R 31/36 |
| | | | | | 340/984 |
| 8,180,507 | B2 * | 5/2012 | Dokken | | G08G 3/02 |
| | | | | | 440/12.5 |
| 9,075,138 | B2 * | 7/2015 | Song | | G01S 13/582 |
| 9,689,983 | B2 * | 6/2017 | Cao | | G01S 13/42 |
| 9,778,358 | B2 * | 10/2017 | Selzler | | G01S 13/95 |
| 10,379,209 | B2 * | 8/2019 | Kishigami | | G01S 7/282 |
| 10,641,882 | B2 * | 5/2020 | Kishigami | | G01S 13/106 |
| 10,908,254 | B2 * | 2/2021 | Lynch | | G01S 7/41 |
| 10,908,272 | B2 * | 2/2021 | Rao | | G01S 13/38 |
| 11,057,170 | B2 * | 7/2021 | Hammond | | G01S 7/0234 |
| 11,061,126 | B2 * | 7/2021 | Ray | | H04L 27/3863 |
| 11,067,682 | B2 * | 7/2021 | Kageme | | G01S 7/02 |
| 11,271,301 | B2 * | 3/2022 | Tzadok | | G01S 13/02 |
| 11,349,202 | B2 * | 5/2022 | Kim | | G01S 7/034 |
| 2005/0099887 | A1 * | 5/2005 | Zimmerman | | G01S 7/527 |
| | | | | | 367/12 |
| 2006/0220949 | A1 * | 10/2006 | Nohmi | | G01S 13/343 |
| | | | | | 342/107 |
| 2008/0147257 | A1 * | 6/2008 | Kuhlgatz | | B63B 49/00 |
| | | | | | 705/1.1 |
| 2008/0165046 | A1 * | 7/2008 | Fullerton | | G01S 7/003 |
| | | | | | 342/21 |
| 2010/0289690 | A1 * | 11/2010 | Dai | | G01S 13/937 |
| | | | | | 342/41 |
| 2011/0022316 | A1 * | 1/2011 | Bendito Vallori | | B63H 21/22 |
| | | | | | 73/861.85 |
| 2012/0062871 | A1 * | 3/2012 | Bugge | | G01J 3/108 |
| | | | | | 356/51 |
| 2014/0285372 | A1 * | 9/2014 | Kambe | | G01S 13/5244 |
| | | | | | 342/27 |
| 2014/0306997 | A1 * | 10/2014 | Kubota | | G01S 13/937 |
| | | | | | 345/634 |
| 2016/0011318 | A1 * | 1/2016 | Cohen | | G01S 19/48 |
| | | | | | 342/357.68 |
| 2016/0266246 | A1 * | 9/2016 | Hjelmstad | | G01S 15/86 |
| 2016/0306039 | A1 * | 10/2016 | Selzler | | G01S 13/288 |
| 2017/0003394 | A1 * | 1/2017 | Revol | | G01S 19/215 |
| 2017/0254893 | A1 * | 9/2017 | Evans | | G01S 13/723 |
| 2018/0074181 | A1 * | 3/2018 | Kishigami | | G01S 13/282 |
| 2018/0172823 | A1 * | 6/2018 | Tyc | | G01S 13/9056 |
| 2018/0259632 | A1 * | 9/2018 | Kishigami | | G01S 7/2921 |
| 2020/0003894 | A1 * | 1/2020 | Giancristofaro | | G01S 13/90 |
| 2020/0182994 | A1 * | 6/2020 | Kageme | | G01S 13/584 |

OTHER PUBLICATIONS

Jul. 19, 2022 Examination Report issued in Canadian Patent Application No. 3,158,356; 6 pp.

Feb. 17, 2021 Search Report issued in International Patent Application No. PCT/GB2020/052860; 5 pp.

Feb. 17, 2021 Written Opinion of the International Searching Authority issued in International Patent Application No. PCT/GB2020/052860; 9 pp.

Holder E J et al; *"A Comparison of PRN and LFM Waveforms and Processing in Terms of the Impact on Radar Resources;"* Oct. 15, 2001; XP010577879; 2001 CIE International Conference on Radar; ISBN: 978-0-7803-7000-5; pp. 529-532; p. 530.

May 21, 2021 International Preliminary Report on Patentability issued in International Patent Application No. PCT/GB2020/052860; 11 pp.

PCT Demand for International Preliminary Examination (Chapter II) submitted Apr. 21, 2021 in International Patent Application No. PCT/GB2020/052860.

* cited by examiner

5ms pulse with no modulation

5ms pulse with chirp modulation

5ms pulse with PRN modulation

MARITIME SURVEILLANCE RADAR

CROSS-REFERENCE TO RELATED APPLICATIONS

This application claims priority to and is a 35 U.S.C. § 371 U.S. National Stage Application of International Application No. PCT/GB2020/052860, entitled "MARITIME SURVEILLANCE RADAR", filed Nov. 11, 2020, which claims priority to European Application No. 19275122.0, entitled "MARITIME SURVEILLANCE RADAR", filed Nov. 13, 2019, the contents of each being incorporated by reference herein in its entirety.

TECHNICAL FIELD

The present invention relates to Earth observation, and particularly to a delay/Doppler radar for maritime surveillance.

BACKGROUND OF INVENTION

Maritime surveillance is high priority for security and defence agencies all around the world. A truly global maritime surveillance network requires the deployment of a constellation of radar satellites that can efficiently detect ships day and night and in all weather conditions. The main issues with deploying such a constellation are the overall costs: payload, platform, launch, and ground segment. These costs are mostly driven by the needs of the payload in terms of size, mass, and power consumption.

The problems of carrying out maritime surveillance on a global scale include:
- the immensity of the area to cover—more than $3.6 \times 10^8$ $km^2$;
- the necessary low data latency—typically less than 1 hour; and
- the required satellite revisit time—typically less than 2-3 hours.

For low data latency and high revisit, a low Earth orbit (LEO) constellation should typically consist of more than 20 satellites in a polar orbit. Although different users may have slightly different needs, these numbers illustrate the challenges of ocean monitoring.

Global maritime surveillance is typically addressed by combining information from several systems, including optical, Synthetic Aperture Radar (SAR), and Automatic Identification System (AIS) spaceborne sensors. On-board AIS technology is typically constrained to areas of the coast and is limited in range by the Earth's curvature. SAR is the most reliable payload for ship detection, offering all-weather day and night capabilities and large coverage. However, SAR instruments require big antennas (at least 3 m) are bulky (typically over 200 kg) and have high power consumption (at least 1 kW). These features result in significant costs that are then multiplied by the required number of satellites needed for global timeliness and coverage.

NovaSAR-S, for example, can operate for 2-4 minutes per orbit which results in a duty cycle of only 5% with >70% of the Earth's surface to be covered with a single 400 km swath. In fact, assuming a constellation of 18 NovaSAR-S satellites, the mean revisit time would be of around two days. NovaSAR-S weights approximately 500 kg, and a constellation of 18 satellites would probably require no less than four to six launches, adding an important overhead to total mission. The revisit time is far away from the desired 3 hours of timeliness.

Short revisit times are essential to detect, track, and enable efficient reaction against illicit activities happening in short time frames. As a result, ultra-wide swath coverage, ideally by a low cost constellation of instruments, is necessary to effectively monitor the oceans. In order to achieve this, each instrument should be able to image a wide swath and be small and compact in size, lightweight and have low power consumption. Current spaceborne SAR systems are far from meeting these requirements, making current global maritime surveillance expensive, inefficient and ineffective.

Embodiments of the present invention aim to address these problems via a new target technique. The technique is able to measure the distance and angular position of one or more marine vessels within the entire illumination footprint from a single radar pulse.

According to an aspect of the present invention, there is provided a maritime radar system comprising a transmitter, a receiver, and one or more processors arranged to provide range and azimuth discrimination of a detection area by performing a delay/Doppler analysis of the echo of a single beam transmitted by the transmitter and received by the receiver.

The beam transmitted by the transmitter may comprise a signal modulated with a pseudo random noise, PRN, sequence, and of a transmission duration which is at least as long as the round-trip time of the signal from the transmitter to the detection area back to the receiver.

The PRN sequence may be a binary code phase-coded into the transmitted beam, which results in a low cross-correlation.

The maritime radar system may be arranged to redirect the transmission beam after each transmission to reposition the detection area to enable multiple observations of the same target.

The transmitter may be arranged to transmit a plurality of beams simultaneously, to widen the coverage area.

The maritime radar system may be arranged to identify the position and heading of one or more marine vessels in the target area.

The maritime radar system may be arranged to transmit a range-Doppler cell ID of a detected marine vessel to a ground station, representing a simplification in the amount of information to be communicated in comparison to conventional tracking systems.

The one or more processors may be arranged to receive marine vessel position information from an automatic identification system, AIS, used by one or more marine vessels, and to use the received position information for a particular marine vessel to verify range and azimuth information for a determined by the particular marine vessel by the one or more processors.

According to another aspect of the present invention, there is provided a satellite payload comprising a maritime radar system according to any one of the preceding claims.

Embodiments of the present invention are associated with significantly reduced DC power consumption, a reduced requirement on satellite downlink data rates, and reduced antenna sizes with respect to conventional SAR systems, resulting in a lightweight and highly efficient instrument.

BRIEF DESCRIPTION OF DRAWINGS

Embodiments of the present invention will be described by way of example only, with reference to the following drawings, of which.

DETAILED DESCRIPTION

Figure 1:
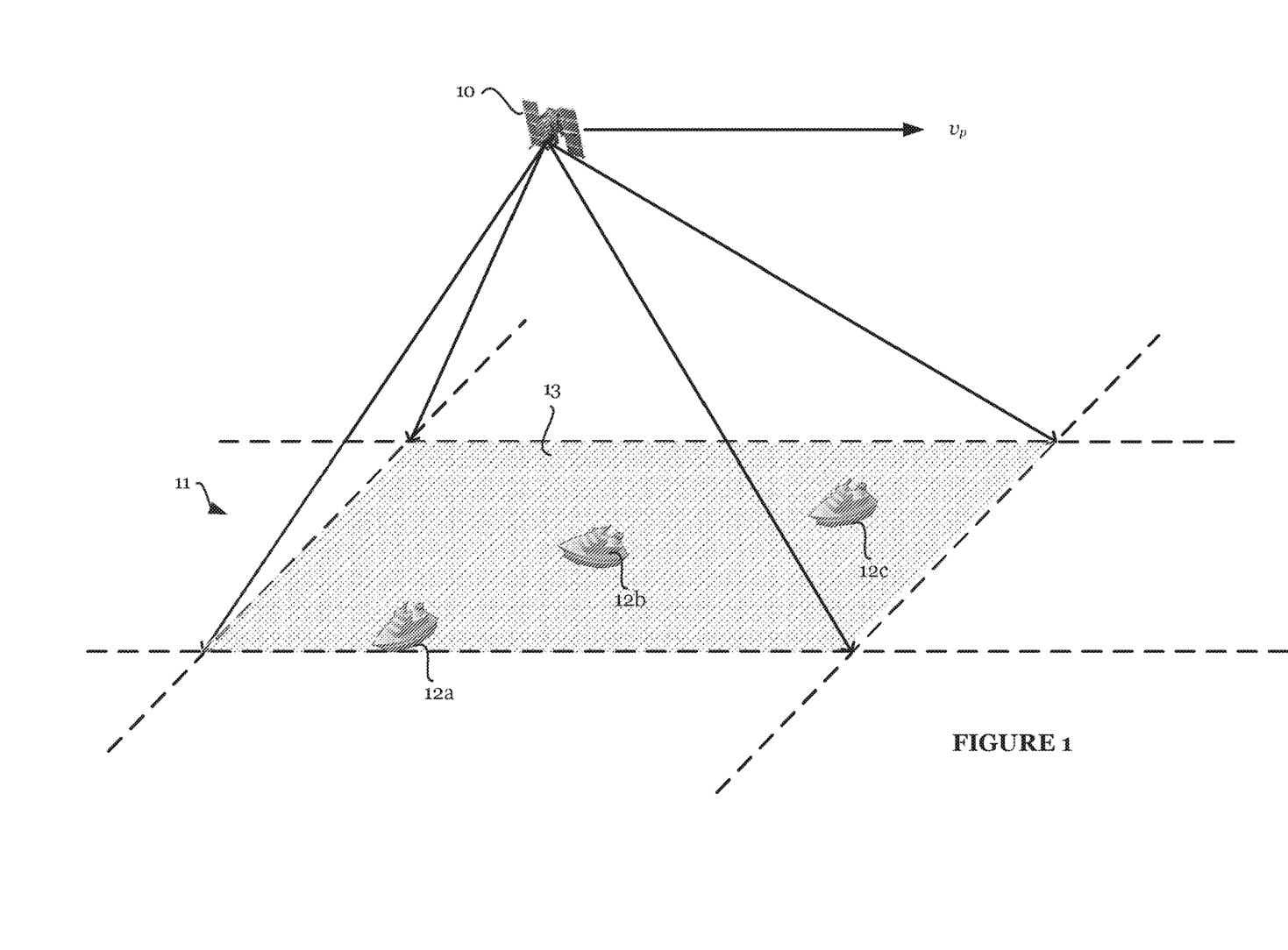
FIG. 1 illustrates a system employing a radar according to embodiments of the present invention.

FIG. 1 illustrates a system employing a radar according to embodiments of the present invention. The radar (not shown) is mounted in a payload 10 attached to a vehicle such as an aircraft or spacecraft, such as a drone or a satellite, which travels over a body of water such as an ocean 11, and the composite payload/vehicle structure is referred to herein as a "radar platform".

On the surface of the ocean 11 are one or more targets 12a-c, such as ships or other marine vessels or watercraft, to be detected by the radar. The radar is a monostatic system in which detection of a target is achieved based on analysis of a signal transmitted from the radar having being reflected back to the same radar as an echo, i.e. the transmitter and receiver of the radar are co-located in the aircraft's payload 10.

The radar transmits a radio frequency (RF) microwave signal towards the ocean. The RF signal may be in a frequency band such as X-band, Ku-band or Ka-band. The transmitted signal extends over a swath which has a coverage area or detection area 13, which is referred to herein as the "footprint" of the radar. The radar is able to detect a reflection of the transmitted signal by an object within the footprint 13. In embodiments of the present invention, it is possible to provide range and azimuth discrimination of each ship 12a-c in the footprint 13 based on the transmission of a single pulse, as will be described below.

Consider the example of a target ship on the ocean surface 11. The radar is mounted to a satellite travelling at velocity $v_p$ above the Earth's surface, wherein $v_p$ is significantly greater (for example, of the order of 7 km/s) than the speed of motion of the ship across the ocean. The radar operates on the Doppler shift principle, by which the relative velocity direction of the target affects the frequency of the transmitted signal, so that information about the ship's position can be derived from the frequency shift.

The angle of the transmitted signal, relative to the motion of the target, affects the frequency shift which is achieved. Generally, the Doppler frequency shift, $f_d$, of the centroid of a reflection of a signal transmitted from a radar of wavelength $\lambda$ from a target having relative velocity $v$ at angle $\theta$ with respect to the radar transmission (the direction of slant range) is given by $f_d = -(2v/\lambda) \cdot \cos \theta$.

Figure 2:
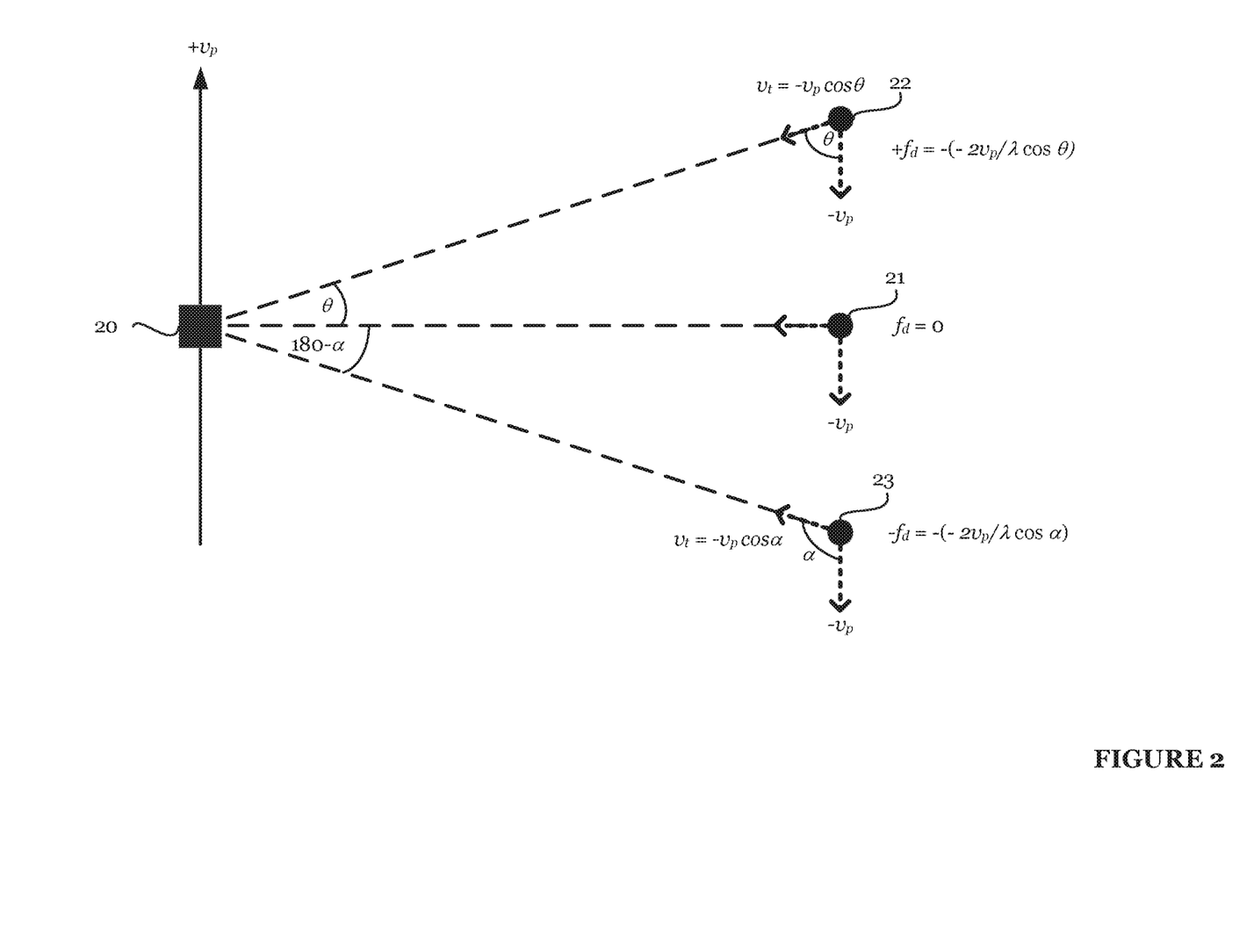
FIG. 2 illustrates the detection principle for the different target positions within the radar footprint of a radar platform of embodiments of the present invention.

FIG. 2 illustrates the detection principle for the different target positions within the radar footprint of a radar platform of embodiments of the present invention.

A first target 21 is shown at a position which is below the radar platform 20, such that an incident signal reaches the target 21 in a direction perpendicular to the relative travel direction of the target 21. If the radar platform 20 travels with velocity $+v_p$, the target 21 can be considered to have a relative velocity of $-v_p$, and an angle of $\theta=90°$ relative to the transmission direction of the radar signal. Consequently, there is zero Doppler shift associated with the returned signal, in the absence of a relative target velocity component $v_t$ in the direction towards the radar platform 20.

A second target 22 is shown at a position "ahead" of the projection of the radar platform's position onto the ocean's surface. The target velocity $v_t$ is shown towards the radar platform 20, and $v_t = -v_p \cos \theta$. There is therefore a Doppler shift of $f_d = -(-2v_p/\lambda \cos \theta)$, a positive shift since $\cos \theta$ is positive for $0° < \theta < 90°$.

A third target 23 is shown at a position "behind" the projection of the radar platform's position onto the ocean's surface. The target velocity $v_t$ is shown towards the radar platform 20, having velocity $-v_p \cos \alpha$. There is therefore a Doppler shift of $f_d = -(-2v_p/\lambda \cos \alpha)$, which is a negative shift since $\cos \alpha$ is negative for $90° < \alpha < 180°$.

Accordingly, it is possible to determine the azimuth, $\theta$, of the target relative to the radar platform 20 based on discrimination of the Doppler shift of a returned signal, in embodiments of the present invention.

The distance or "range" of the target from the radar platform 20 is determined based on measurement of the time delay between transmission of a signal by the radar and receipt of a reflected signal by the radar, since the signal velocity is known.

The radar of embodiments of the present invention is thus able to employ what is referred to herein as a "delay/Doppler" method to determine both range and azimuth information for targets within the footprint 13.

The radar of embodiments of the present invention has an advantage in that it is possible to determine range and azimuth information for all targets within the footprint 13 of a single signal. This is made possible by the nature of the transmission signal. The radar of embodiments of the present invention transmits a single, long, pulse-modulated signal with a Pseudo Random Noise (PRN) sequence or waveform. The PRN waveform has a small cross-correlation and may, in some embodiments, be a binary sequence known as a Gold code.

In embodiments of the present invention, the "ones" and "zeros" of the binary sequence modulated a microwave carrier signal using binary phase shift keying (BPSK), such that the sequence is phase-coded into the carrier frequency.

Such a small cross-correlation makes it possible to discriminate easily between reflections of the signal by different targets. Frequency shifts associated with azimuthal measurements will lead to receipt of frequency-shifted versions of the transmitted PRN waveform which have no correlation with each other. The reflected signal, in the frequency domain, will have discrete peaks at different Doppler frequencies, representing the azimuth of multiple targets.

In contrast, a SAR system is based on collection of signals from a number of different echoes as the radar moves over the area of interest, in order to increase the effective size of the radar. In order to do this, the transmission pulse is typically short, in order to increase the bandwidth of the radar, employing chirping techniques as known in the art. This improves distance resolution, but at the cost of poor Doppler resolution. Azimuth resolution is then achieved by combination of the different gathered echoes.

In one embodiment, assuming LEO operation, where the radar platform 20 is at an altitude of the order of 500 km, the radar transmits a pulse in the Ku-band for approximately 5 ms, and then receives for another 5 ms. Depending of the elevation angle of the radar platform from the ocean surface 11, this will enable a swath of a width of approximately 25-45 km to be covered, with azimuthal scanning range of approximately 10 km being covered as the radar platform moves in its orbit above the ocean surface 11.

In the context of the dimensions of the example above, in terms of the size of the radar footprint 13, the size of a target is negligible, and the target can be regarded as a "point scatterer", in which the reflected signal is modelled as reflection from a single point of no physical size.

After the 10 ms period has passed, the operation is repeated with a new radar beam, which points to a different coverage area, such as an area is adjacent, in the direction substantially perpendicular to the direction of travel of the radar platform, to that covered by the previous signal. In one embodiment, 15 beams can be covered, leading to a coverage area of up to 675 km.

In some embodiments, the radar platform is configured such that it is possible to perform both left-sided and right-sided looks, relative to the radar platform, and multiple looks can be performed for each radar beam. In the embodiment above, 30 beams can be covered where both left-sided and right-sided looks are used, with more than four looks per target in each case. This will then provide a total combined swath of more than 1000 km.

Figure 3:
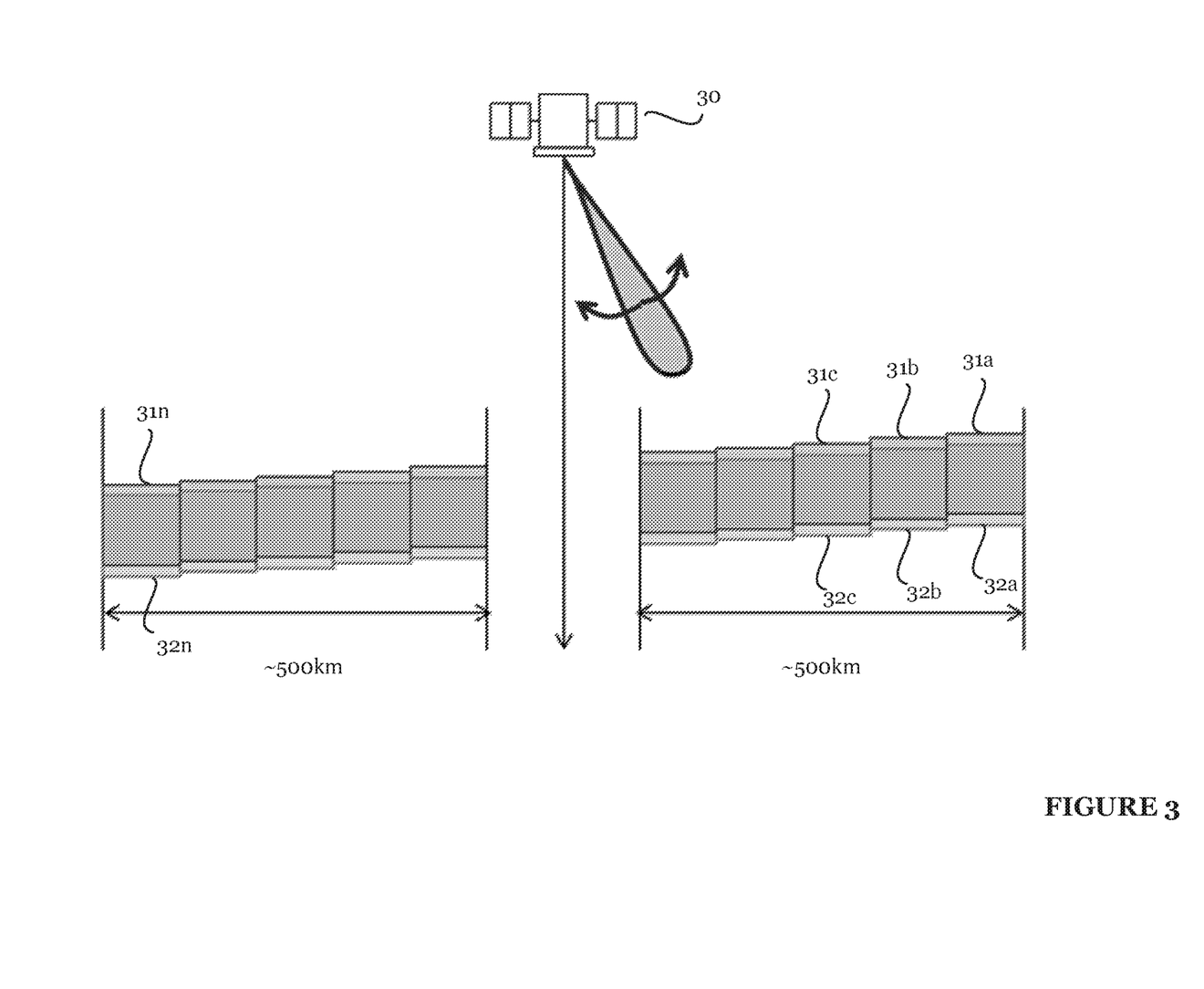
FIG. 3 illustrates the principle of radar coverage according to an embodiment of the present invention.

FIG. 3 illustrates the principle of radar coverage according to an embodiment of the present invention. The radar is illustrated as mounted to a vehicle 30 which is travelling in the downward direction in the figure. The radar beam position moves from the right to the left of the figure, and as it does so, it illuminates a first succession of coverage n areas 31a, 31b, 31c, . . . , 31n via a sequence of transmission beams illustrated with a slant from upper right to lower left, before returning to the right most edge and repeating the scan from the updated position of the radar platform in a second pass, illuminating a second succession of n coverage areas 32a, 32b, 32c, . . . , 32n. As shown in FIG. 3, there is overlap between the coverage areas of the first and second successions, such that a target in the overlap region can be observed twice as the radar platform travels overhead, improving detection capabilities.

In some embodiments, the duration of the transmission pulse may be substantially equal to the round-trip duration of the signal from the radar platform to the target area (the surface of the Earth, for example, the sea) and back to the transmitter. In such embodiments, the receiver and transmitter of the radar can be arranged as an integrated transceiver, which switches mode from a transmitter to a receiver at the end of the duration of the transmission signal. This ensures that the full extent of the transmission window is used of the transceiver, which maximises range and azimuthal resolution. In alternative embodiments, range and azimuthal resolution may be increased yet further by employing a separate transmitter and a receiver in the radar platform, which allows longer transmission pulses to be used. The longer the transmission pulse which is used, the smaller the antenna size that is required, as the size of the per-signal coverage area is increased.

The use of a PRN code enables high compression gains and good discrimination of both range and azimuth. Doppler discrimination capabilities are similar to those of unmodulated pulses, but in contrast, a rectangular unmodulated pulse, for example, offers very poor range resolution, for example 750 km for a 5 ms pulse. Chirp waveforms, by contrast, offer excellent range resolution (for example, a 1 m slant range for a 150 MHz signal), but do not provide Doppler discrimination, as a time shift is introduced into the radar impulse response, and all targets of the antenna footprint are compressed with a single chirp replica, regardless of its Doppler properties.

Figure 4:
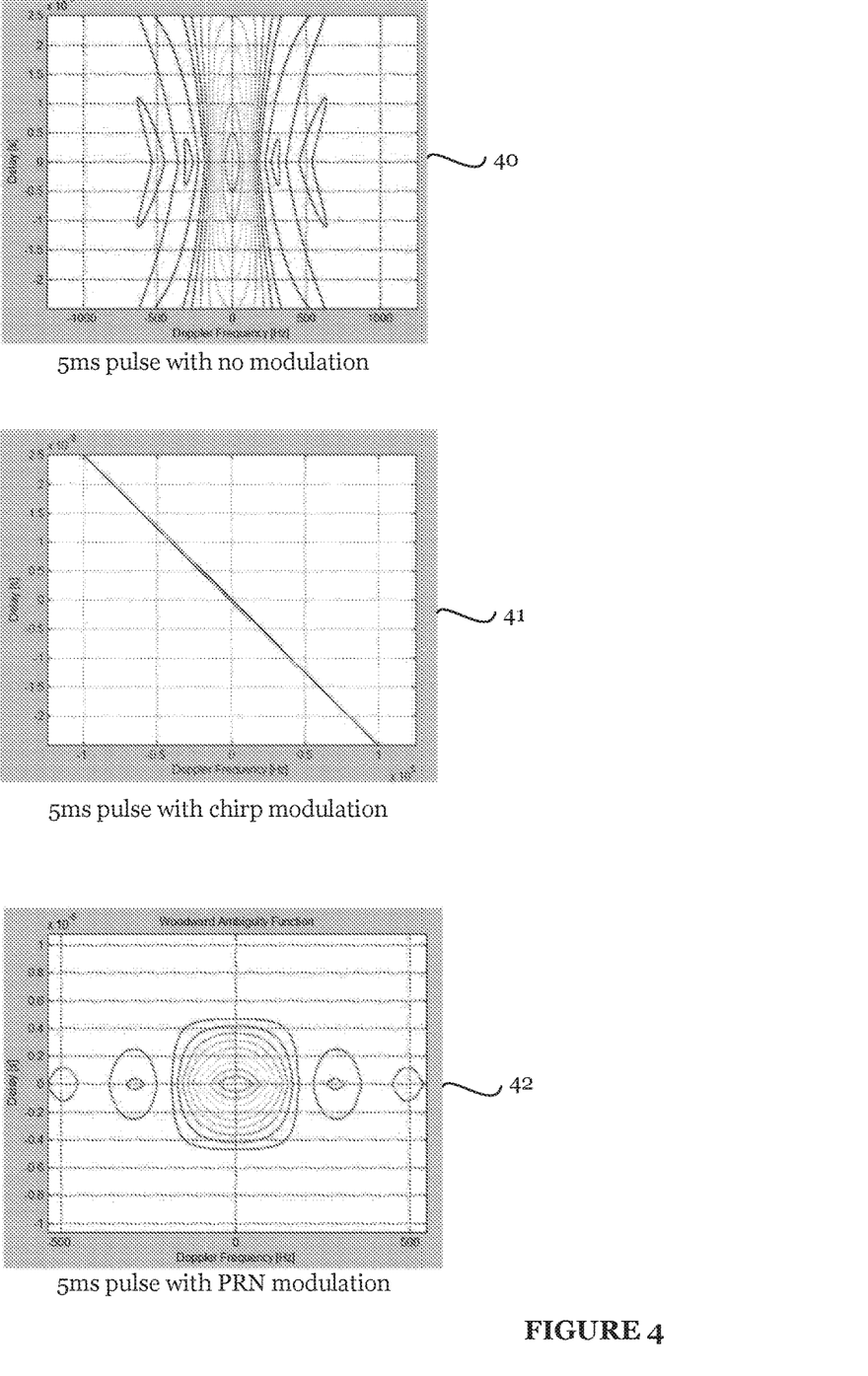
FIG. 4 illustrates a comparison of a Woodward Ambiguity Function for different radar signal pulses.

FIG. 4 illustrates the Woodward Ambiguity Function for a 5 ms duration pulse with no modulation 40, chirp modulation 41, and PRN modulation 42 according to embodiments of the present invention, which illustrates the principles above. Embodiments of the present invention are not associated with range/azimuth ambiguities since they operate on the basis of a single pulse In embodiments of the present invention, the signal transmitted from the radar platform has a frequency response represented by a main lobe centred on the transmission frequency, with a number of smaller sidelobes symmetrically positioned either side of the main lobe in the frequency domain, with nulls between each lobe. This frequency response is typically of most antenna systems. The sidelobes can be reduced in relative size in embodiments of the present invention through the use of a longer PRN code pulse, but the optimisation of the side-lobe structure of the antenna pattern in elevation and azimuth is relaxed as the swath width is only limited by the antenna footprint and not by the diamond plot or the range/azimuth ambiguities typically constrained by the SAR pulse repetition frequency (PRF). This follows as embodiments of the present invention do not suffer from range/azimuth ambiguities since they operate on a single pulse basis. The specific PRN code to be used is independent of the transmission frequency of the signal.

In some embodiments, it is possible to synchronise the output of the radar platform of embodiments of the present invention with an AIS. The information provided via AIS may act as a means of verifying the accuracy of the output of embodiments of the present invention, from which a configuration or calibration routine, for example, could be performed. In such embodiments, the constraints on the resolution of the radar can be reduced, due to the availability of the supplementary information. In addition, it is possible to supplement the position and azimuthal output of the radar platform with information such as a vessel's ID or callsign, in order to enhance the tracking information provided.

Example Configuration

An example of a satellite-based radar system according to an embodiment of the present invention is specified by the parameters below (Table 1).

TABLE 1

Example specification of radar system

| Parameter | Value | Parameter | Value |
|---|---|---|---|
| Satellite Height | 560 km | Antenna Length | 1 m |
| Carrier Frequency | 9.2 GHz | Antenna Height | 1 m |
| Chirp Bandwidth | <500 MHz | Azimuth Coverage | 10 km |
| Tx Peak Power | 320 W | Number of beams | 15 |
| Pulse Duration | 5 ms | Losses | 2 dB |
| Noise Figure | 4 dB | Ship RCS | 29 dBm$^2$ |

These system parameters provide up to four independent observations of a single target that have been multi-looked together and reported in the performance estimation.

It will be appreciated that modifications to the parameters may be made in dependence on a required detection probability, and false alarm rate, at a particular signal to noise ratio (SNR) and signal to clutter ratio (SCR), in addition to resource availability such as power budget, transmission rates, constellation launch restrictions, and so on.

Embodiments of the present invention are associated with at least the following advantages, in relation to reduced data latency, antenna size and power consumption.

Low Data Latency

Considering a spaceborne LEO scenario, the maximum pulse duration, assuming a monostatic compact system, is limited by the pulse round-trip time. This is of the order of 5 ms, and thus translates into a Doppler resolution cell of 200 Hz. The Doppler resolution can be then translated into ground resolution cell multiplying the slant range to the ship by the instantaneous azimuth beam-width which results, for the 200 Hz case, in approximately 300-400 m.

With this in mind, the data processing can be done on-board by using a technique similar to that used for delay-Doppler Map (DDM) generation in bistatic Reflected Global Navigation Satellite Systems (GNSS-R). The DDM's matched filter bank can be implemented in a Field-Programmable Gate Array and produce results in near real-time.

A ship detection algorithm is applied in some embodiments to the DDM, reporting to the ground only the cells with a positive detection. Only a few bytes per ship will be sent to the ground which will reduce the data to be down-linked quite significantly with respect to, e.g., SAR systems. All this makes possible a beyond line-of-sight capability in terms of sending data down to ground, and allowing for timeliness and efficient data provision to the end user.

Small Antenna Size

It is anticipated that the proposed radar antenna dimensions would be smaller than 1 m×1 m. This is a significant reduction in the antenna area compared to the smallest antenna ever proposed for any spaceborne SAR mission; for comparison, the NovaSAR-S antenna measures 3 m×1 m. There are two main factors contributing to this miniaturisation: the single-pulse operation and the long transmitted pulses.

Transmitting/receiving a single pulse avoids range and azimuth ambiguities—an important problem related to antenna dimensions in SAR systems. In SAR, the antenna length is related to the range/azimuth ambiguities. The shorter the antenna, the higher the pulse repetition frequency (PRF) is needed to avoid aliasing of the Doppler spectrum. However, setting a high PRF results in an increase of the range ambiguities and reduces the attainable swath width. On the other hand, falling short of PRF results in an increase of the azimuth ambiguities.

With the proposed radar single pulse operation, this problem does not apply any more. Small antennas are desired to increase the covered ground antenna footprint, with the power budget the only limitation for further shrinking the antenna size. Long pulses compensate for the loss in antenna directivity, balancing the power budget, as below.

Lower Power Consumption

The use of long pulses and the need of a single echo for ship detection mapping result in an extremely power-efficient instrument.

The following assumptions have been considered when computing an indicative DC power consumption budget for a radar according to an embodiment of the present invention:

Radar Tx peak power=320 W→DC power consumption=4×320 W=1280 W;
15 beams covered, revisiting each beam at least 4 times→instrument duty cycle=25%;
Oceans cover the 70% of the Earth surface→mean operational duty cycle;
The radar back-end electronics (+RF elements)=100 W.

This results in a preliminary average power budget of (1280 W+100 W)×0.25×0.7=240 W.

Table 2 presents an indicative power budget comparison between NovaSAR-S and embodiments of the present invention. The antenna size and the wavelength are quadratic contributions, the Radar Cross Section (RCS) of the ships are based on actual airborne campaign data at S-Band up-scaled to X-Band, and the number of "Independent Observations" refer to the pulses integrated for azimuth focusing in the NovaSAR-S case and to the independent available observations using embodiments of the present invention. It will be appreciated that the final power difference could be optimised yet further by improving instrument losses, made possible because it has a simpler RF architecture, and considering that shorter slant ranges of operation compared to NovaSAR-S maritime mode.

TABLE 2

Power budget comparison

| Parameter | NovaSAR-S | Embodiments of present invention | Power Difference |
| --- | --- | --- | --- |
| Peak Tx Power | 1.8 kW | 320 W | −7.5 dB |
| Antenna Size | 3 m × 1 m | 1 m × 1 m | −9.5 dB |
| Wavelength | 9 cm | 3 cm | +9.5 dB |
| Ship RCS | 20 dBm$^2$ | 29.5 dBm$^2$ | +9.5 dB |
| Pulse Duration | 0.2 ms | 5 ms | +14 dB |
| Independent Observations | 300 | 4 | −19 dB |
|  |  | Total | −3 dB |

Reduction of Instrument Data Rate

As follows from the disclosure above, the radar of embodiments of the present invention is not an imaging radar, but is a ship detection radar. As such, it looks for point targets over the oceans and, after detection of a ship, sends the position to the ground station(s). The amount of information to be downloaded can be significantly reduced if a simple cell ID identification number (related to a particular range-Doppler cell) is sent to the ground, together with the GPS time and the satellite velocity and position (PVT) when a ship(s) is detected.

In some embodiments, the on-board pre-processing consists in the generation of Delay-Doppler Maps (DDM) similar to GNSS-R and covering the whole antenna footprint. Then, a ship detection algorithm will identify the cells in the DDM, e.g., above a particular threshold (this is a simple approach just for illustration purposes). Finally, the detected cell IDs together with the time and position data can be downloaded. The actual position of the ships can be computed on-the-ground from the satellite PVT and cell ID information.

This technique allows a significant reduction in data rate. A NovaSAR-S maritime image (400 km×400 km) requires a data volume of 13.7 Gbits and produces a data throughput of 225 Mbit/s. Assuming that in such area 200 ships are detected and each cell ID is coded with 32 bits, in comparison, a radar according to an embodiment of the present invention would have produced a data volume of 200×32 bits=6.4 kbits in addition to the satellite position, velocity and time information.

Radars according to embodiments of the present invention are a wide-swath fit-per-purpose maritime surveillance radars that will be able to operate continuously over the oceans with an estimated transmit peak power of only 320 W and an antenna area of less than 1 m$^2$. The latter has an important impact on the instrument size/mass, allowing for payload compactness and miniaturisation making it feasible to operate on micro-platforms such as OneWeb. Embodiments of the present invention enable a payload mass of less than 5 kg and average DC power consumption of less than 350 W, as set out above. Therefore, assuming a single-sided swath width of 500 km, a constellation of 18 payloads comprising radars according to embodiments of the present invention could, for example, be packed in a single Soyuz launch and offer a mean revisit time better than 3 h globally.

Comparison with Other Systems

In table 3 below, the performance of a LEO constellation consisting of 18 satellites is presented based on three different payloads: Sentinel-1, NovaSAR-S, and embodiments of the present invention. The benefits of the proposed payload in terms of coverage, data downlink, and power together with a qualitative cost estimate are presented.

TABLE 3

Performance comparison

|  | Sentinel-1 | NovaSAR-S | Embodiments of present invention |
|---|---|---|---|
| Mode | Extra Wide Swath | Maritime Mode | Single Sided |
| Swath | 400 km | 400 km | 500 km |
| Operation Time | 25 min/orbit | 2-5 min/orbit | 66.5 min/orbit |
| Peak Power | 4 kW | 1.8 kW | 320 W |
| PRF | 1000-3000 Hz | 1000-1800 Hz | <50 Hz |
| Pulse Duration | <0.05 ms | <0.2 ms | 5 ms |
| Mean Revisit Time | <10 h | 2 days | <3 h |
| Downlink | 520 Mbit/s | 500 Mbit/s | Few bytes/ship |
| Cost | ££££ | ££ | £ |

Figure 5:
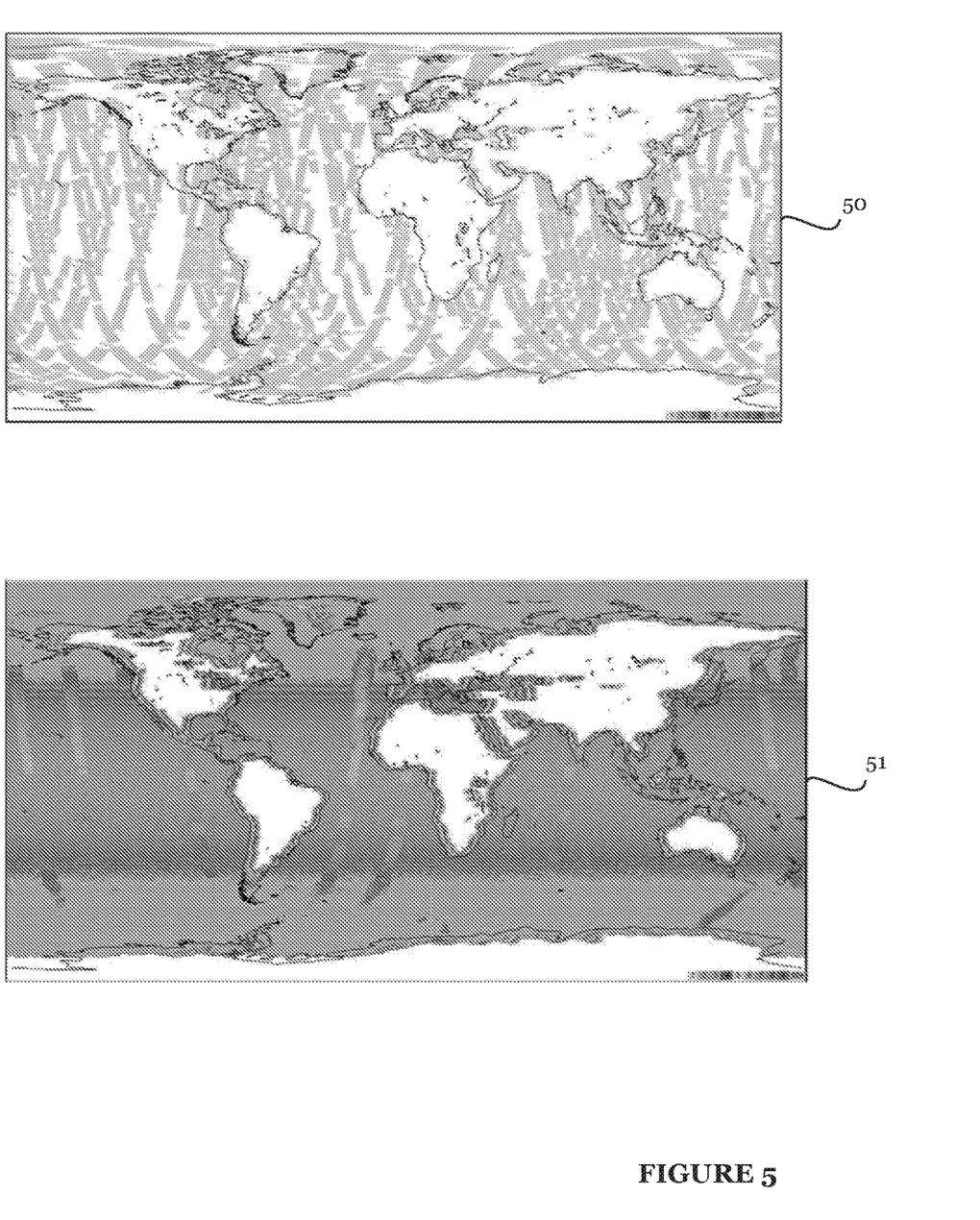
FIG. 5 illustrates a comparison of ocean surface coverage of a constellation of 18 LEO satellites after one day.

FIG. 5 shows the ocean surface coverage of a constellation of 18 LEO satellites after one day. In image 50, NovaSAR-S payloads with current specifications are considered, i.e. 400 km swath. In image 51, the equivalent case achieved with payloads according to embodiments of the present invention and 500 km swaths are shown. There is a significant increase in operational duty cycle from 5% to 70%. With embodiments of the present invention, the oceans are seen at least five to six times a day around the Equator and more than 10 times at European latitudes. In the NovaSAR-S case ocean areas are not even imaged once a day.

Besides the advantages in terms of coverage, the payload according to embodiments of the present invention offer on-board pre-processing (Delay-Doppler Maps generation) and ship detection capabilities that will reduce the data downlink needs orders of magnitude compared to conventional SAR system. This is accomplished by the use of long pulses that avoid the conventional SAR azimuth focusing. Embodiments of the present invention only downloads a few bytes of information if a ship is detected, in contrast with SAR payloads that require wide-band downlinks, typically ~500 Mbps, to provide raw data to the ground SAR processor. The latter introduces a significant data latency to conventional maritime SAR products.

Figure 6:
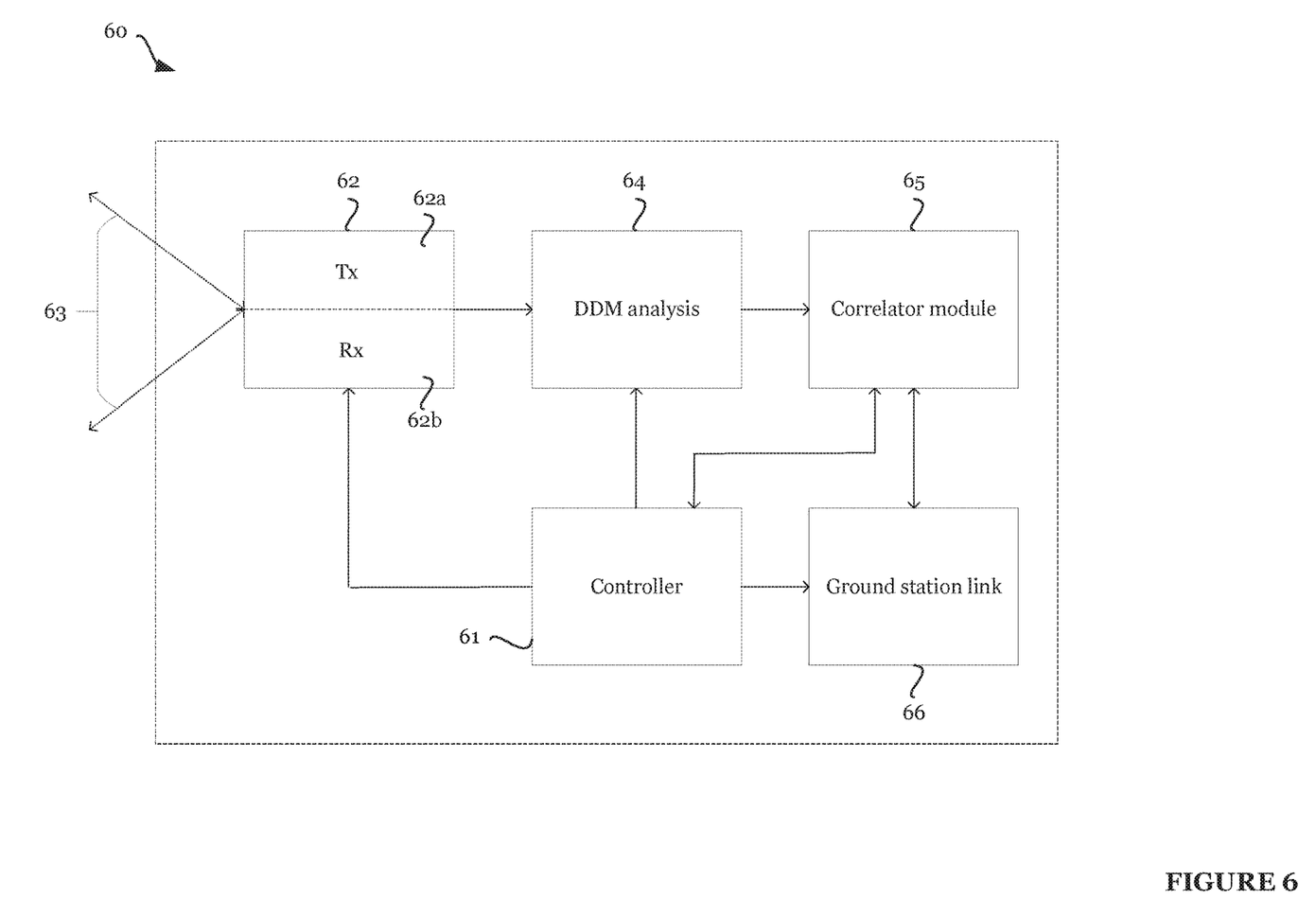
FIG. 6 illustrates a radar according to embodiments of the present invention.

FIG. 6 illustrates a schematic of a radar 60 according to embodiments of the present invention.

The radar 60 comprises a central controller 61 which controls a transmit/receive (Tx/Rx) module 62 to transmit a signal to a coverage area 63, as described above. The transmit/receive module 62 may be part of an integrated transceiver, or may be implemented as two embodiments. The transmitter and receiver components may be implemented as a phased array antenna, operating under the control of a beamformer (not shown), and comprising analogue to digital circuitry, amplification and noise reduction circuitry (not shown).

The Tx module 62a operates to modulate a local oscillator signal at a predetermined microwave frequency with a PRN sequence stored in a memory (not shown). The Rx module 62b operates to downconvert a received signal into an intermediate frequency for processing.

The downconverted signal is passed to a delay/Doppler Map analysis module 64 which identifies targets within the coverage area on the basis of the Doppler shift and range analysis associated with the reflected signal at the receiver 62b. As described above, the DDM analysis module 64 may operate to generate a Delay-Doppler Map, as is known in the art. The DDM analysis module 64 is controlled by the central controller 62.

The output of the DDM analysis module 64 is a range and an azimuth in measurement for a target, plotted on a two-dimensional frame of reference. The output is passed to a correlator module 65 which correlates the output from the DDM analysis with real-world positions. For example, the correlator module 65 may receive mapping information from a ground station link 66, which may be stored in radar memory, such that the two-dimensional range/azimuth data is correlated to geographical position information. The position determined in this manner is communicated to a ground station (which may or may not be the same ground station as that which provided mapping information) via the ground station link 66 to be processed by a user, under the control of the controller 61.

In alternative embodiments, the correlator module 65 can be bypassed, and the DDM analysis module 64 can output a cell ID associated with the position of a target, as described above, and the correlation between the cell ID and the position can be performed at the ground station, based on position information associated with the radar 60. The radar position information may be determined by the radar itself, or may be provided to the controller 61 by the vehicle to which the radar 60 is mounted, e.g. the on-board controller of a satellite.

Any or each of the modules illustrated in FIG. 6 may be implemented in hardware, or software, or a combination of the two, and components may be integrated as a single module, or separated into distinct modules.

It will be appreciated that a number of modifications to the described technology, in terms of the duration of a transmission signal, the nature of its low-autocorrelation, the nature of the transmitter and receiver arrays, and the specific nature of the information provided to the ground link as an output, in dependence on the intended coverage area and applications, provided the ability to provide range and azimuthal distinction resolution from single signal is preserved. For example, a satellite-based radar platform intended for continuous use may be configured differently from an aircraft-based radar platform intended to cover a more specifically-defined region for a particular period of time.

The invention claimed is:

1. A maritime radar system configured for mounting to an aircraft or spacecraft for travel over a detection area, the maritime radar system comprising a transmitter, a receiver, and one or more processors arranged to provide range and azimuth discrimination of targets within the detection area, by performing a delay/Doppler analysis, based on a velocity of travel of the maritime radar system and relative velocities between the targets and the maritime radar system, of an echo of a side-looking beam, relative to travel of the maritime radar system,
wherein the one or more processors are configured to provide range and azimuth discrimination of targets using a single pulse of the side-looking beam transmitted by the transmitter and received by the receiver, wherein the single pulse transmitted by the transmitter comprises a signal modulated with a pseudo random noise, PRN, sequence, and of a transmission duration which is at least as long as the round-trip time of the signal from the transmitter to the detection area back to the receiver.

2. The maritime radar system according to claim 1, wherein the PRN sequence is a binary code phase-coded into the transmitted single pulse.

3. The maritime radar system according to claim 1, arranged to redirect the side-looking beam after each transmission to reposition the detection area.

4. The maritime radar system according to claim 3, wherein the transmitter is arranged to transmit a plurality of beams simultaneously, each of the plurality of beams having a single pulse.

5. The maritime radar system according to claim 1 arranged to identify a position and a heading of one or more marine vessels in the detection area.

6. The maritime radar system according to claim 5, arranged to transmit a range-Doppler cell ID of a detected marine vessel to a ground station.

7. The maritime radar system according to claim 6, wherein the one or more processors are arranged to receive marine vessel position information from an automatic identification system, AIS, used by one or more marine vessels, and to use the received position information for a particular marine vessel to verify range and azimuth information for a determined by the particular marine vessel by the one or more processors.

8. A satellite payload comprising the maritime radar system according to claim 1.

* * * * *